United States Patent
Schrader

(10) Patent No.: US 8,736,097 B1
(45) Date of Patent: May 27, 2014

(54) HYDROKINETIC GENERATOR SYSTEM

(71) Applicant: Clarence W. Schrader, Wakefield, RI (US)

(72) Inventor: Clarence W. Schrader, Wakefield, RI (US)

( * ) Notice: Subject to any disclaimer, the term of this patent is extended or adjusted under 35 U.S.C. 154(b) by 0 days.

(21) Appl. No.: 14/147,761

(22) Filed: Jan. 6, 2014

Related U.S. Application Data

(60) Provisional application No. 61/824,438, filed on May 17, 2013.

(51) Int. Cl.
*F03B 13/00* (2006.01)
*H02P 9/04* (2006.01)

(52) U.S. Cl.
USPC .............................................. 290/54; 290/43

(58) Field of Classification Search
USPC .......... 290/43, 54; 60/398, 698; 417/331, 333
See application file for complete search history.

(56) References Cited

U.S. PATENT DOCUMENTS

| | | | | |
|---|---|---|---|---|
| 1,523,031 A | * | 1/1925 | Mitchell, Jr. | 417/333 |
| 3,939,356 A | * | 2/1976 | Loane | 290/52 |
| 4,041,707 A | * | 8/1977 | Spector | 60/641.14 |
| 4,282,444 A | * | 8/1981 | Ramer | 290/52 |
| 4,408,127 A | * | 10/1983 | Santos, Sr. | 290/54 |
| 4,409,490 A | * | 10/1983 | Caputo | 290/4 D |
| 4,514,977 A | * | 5/1985 | Bowen | 60/398 |
| 6,739,131 B1 | * | 5/2004 | Kershaw | 60/512 |
| 6,861,766 B2 | * | 3/2005 | Rembert | 290/43 |
| 7,579,700 B1 | * | 8/2009 | Meller | 290/43 |
| 8,127,542 B1 | * | 3/2012 | Dolcimascolo | 60/398 |
| 2009/0058092 A1 | * | 3/2009 | Chen | 290/54 |
| 2012/0086204 A1 | * | 4/2012 | Re | 290/43 |
| 2012/0187690 A1 | * | 7/2012 | Walton et al. | 290/54 |

* cited by examiner

*Primary Examiner* — Julio Gonzalez Ramirez
(74) *Attorney, Agent, or Firm* — Salter & Michaelson

(57) ABSTRACT

A hydrokinetic generator apparatus that includes a liquid reservoir having an outlet port and an inlet port that is disposed over the outlet port; an outflow valve that is disposed at the outlet port of the liquid reservoir; at least one generator module coupled from the liquid reservoir and including at least one fill pipe for receiving liquid expelled from the liquid reservoir, and at least one outlet port; at least one surge generator disposed in the fill pipe; and an outflow valve at a base of the generator module. The outlet port of the generator module is coupled to the inlet port of the liquid reservoir. The apparatus further includes a battery pack; an electrical controller responsive to a voltage across the battery pack for controlling said valves; and an electrical charging hub responsive to the surge generator for re-charging the battery pack.

12 Claims, 3 Drawing Sheets

HYDROKINETIC GENERATOR SYSTEM

RELATED CASE

Priority for this application is hereby claimed under 35 U.S.C. §119(e) to commonly owned U.S. Provisional Patent Application No. 61/824,438 which was filed on May 17, 2013 which is incorporated by reference herein in its entirety.

FIELD OF THE INVENTION

The present invention relates in general to a hydrokinetic generator system and pertains also to a system that is the primary power source for an electric vehicle.

BACKGROUND AND SUMMARY OF THE INVENTION

There presently exists several different types of hybrid vehicles. The typical hybrid vehicle is a hybrid of gasoline and electric. It is an object of the present invention to provide a primary power source by means of a hydrokinetic generator whereby the hydrokinetic generator is used to recharge battery packs mounted in the vehicle.

Another object of the present invention is to provide a hydrokinetic generator device and system that is efficient in operation, that can be manufactured relatively inexpensively and that provides a low cost way of recharging battery packs. To accomplish the foregoing and other objects, features and advantages of the present invention there is provided a hydrokinetic generator apparatus comprising:

a liquid reservoir having an outlet port and an inlet port that is disposed over the outlet port;

an outflow valve that is disposed at the outlet port of the liquid reservoir;

at least one generator module coupled from the liquid reservoir and including at least one fill pipe for receiving liquid expelled from the liquid reservoir, and at least one outlet port;

at least one surge generator disposed in the fill pipe;

an outflow valve at a base of the generator module;

means for coupling the outlet port of the generator module to the inlet port of the liquid reservoir;

a battery pack;

an electrical controller responsive to a voltage across the battery pack for controlling said valves; and an electrical charging hub responsive to the surge generator for re-charging the battery pack.

In accordance with other aspects of the present invention the liquid reservoir also includes a drop valve adjacent to the inlet port, the liquid reservoir may be or either a rectangular shape or inverted bottle shape; the generator module includes a pair of fill pipes; there is defined between the pair of fill pipes an air chamber; further including a bellows disposed in the air chamber; further including fixed and movable plates supported at opposite ends of the bellows; the top plate has a plurality of inflow/outflow air vents; the generator module includes a base portion and a neck portion; including a plurality of generator modules that are interconnected in series between the outlet port and the inlet port of the liquid reservoir; including a drop valve disposed at the inlet port of the liquid reservoir; a pair of drop valves at respective fill pipes; wherein the outflow valve at a base of the generator module is comprised of a pair of retractable disc valves; and a disc valve at an input to the air chamber.

In another version of the present invention there is provided a hydrokinetic generator apparatus comprising:

a liquid reservoir having an outlet port and an inlet port that is disposed over the outlet port;

at least one generator module coupled from the liquid reservoir and including at least one fill pipe for receiving liquid expelled from the liquid reservoir, and at least one outlet port; at least one surge generator disposed in the fill pipe;

an electrical controller for controlling said valves;

a battery pack; and an electrical charging hub.

In accordance with still other aspects of the present invention the generator module includes a pair of fill pipes, and wherein there is defined between the pair of fill pipes an air chamber; a bellows is disposed in the air chamber, fixed and movable plates supported at opposite ends of the bellows, and wherein the top plate has a plurality of inflow/outflow air vents; the generator module includes a base portion and a neck portion, including a plurality of generator modules that are interconnected in series between the outlet port and the inlet port of the liquid reservoir, a drop valve disposed at the inlet port of the liquid reservoir; a pair of drop valves at respective fill pipes; wherein the outflow valve at a base of the generator module is comprised of a pair of retractable disc valves; and a disc valve at an input to the air chamber.

In still another version of the present invention there is provided a hydrokinetic generator system comprising:

a liquid reservoir having an outlet port and an inlet port that is disposed over the outlet port;

a plurality of generator modules that each include an input port and an output port;

said plurality of generator modules coupled in series between the outlet port of the liquid reservoir and the inlet port of the liquid reservoir;

said plurality of generator modules being inter-coupled for liquid flow therebetween so that the output port of one generator module connects with the input port of an adjacent generator module;

each said generator module including a pair of fill pipes for receiving liquid expelled from the liquid reservoir;

at least one surge generator disposed in each fill pipe;

an electrical controller;

a battery pack; and an electrical charging hub.

In accordance with further aspects of the present invention there is defined between the pair of fill pipes an air chamber and further including a bellows disposed in the air chamber; fixed and movable plates are supported at opposite ends of the bellows, and wherein the top plate has a plurality of inflow/ outflow air vents; the generator module includes a base portion and a neck portion, including a plurality of generator modules that are interconnected in series between the outlet port and the inlet port of the liquid reservoir, an outflow valve that is disposed at the outlet port of the liquid reservoir; an outflow valve at a base of the generator module; a drop valve disposed at the inlet port of the liquid reservoir; a pair of drop valves at respective fill pipes; wherein the outflow valve at a base of the generator module is comprised of a pair of retractable disc valves; and a disc valve at an input to the air chamber; and valve means are for controlling the flow or water through the fill pipes, wherein the electrical controller is responsive to a voltage across the battery pack for controlling said valve means; and wherein the electrical charging hub is responsive to the surge generator for re-charging the battery pack.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

In accordance with the present invention there is illustrated a primary power source for an electric vehicle that contains several battery packs that may be placed at strategic locations in the vehicle. The primary power source comprises a reservoir and one or more generator modules that are intercoupled between an outlet port and an inlet port of the liquid reservoir.

Figure 1:
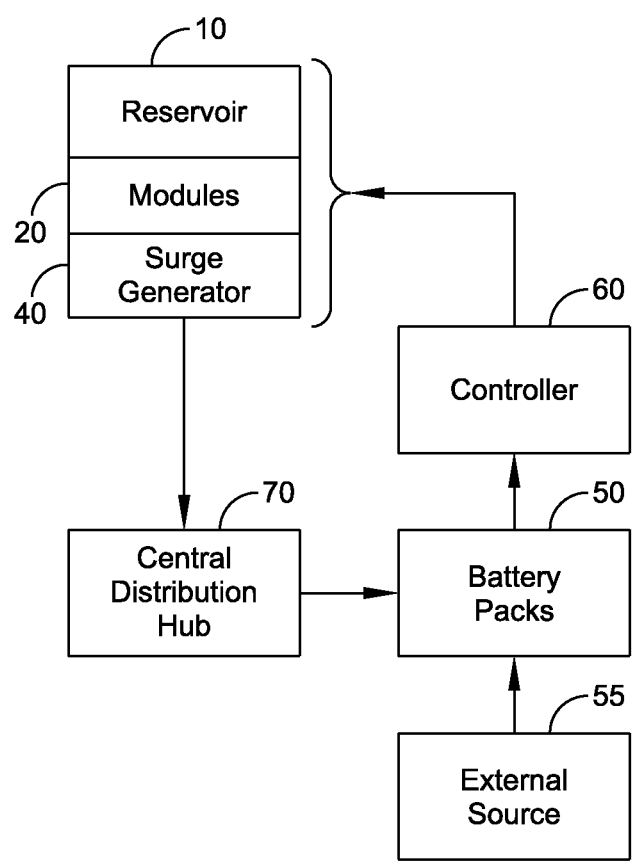
FIG. 1 is a schematic block diagram of a system of the present invention usable in powering a vehicle.

FIG. 1 is a schematic block diagram that illustrates the main components of the present invention. These components provide at least partial recharging of a battery pack, although, the battery pack itself may also be recharged by an external power source. In FIG. 1 the components include a liquid reservoir 10, generator modules 20 associated with the liquid reservoir and a series of surge generators 40 coupled from the generator modules 20. An electrical controller 60 is also employed for sensing signals from the battery pack 50 for initiating action of the generator system. FIG. 1 also illustrates an external source 55 capable of periodically recharging the battery pack 50. The output from the surge generators 40 coupled by way of a central distributor or hub 70 to the battery pack for recharging thereof.

When the combined total output of a 12 volt battery pack is reduced by a certain amount such as to 11 volts, the electrical controller 60 senses this condition and enables operation of the generator apparatus of the present invention. The 12 volt battery pack may actually be comprised of a series of series-connected or parallel-connected individual packs. Each battery pack may be comprised of 24 lithium batteries. As indicated previously, when the electrical controller 60 senses a low voltage condition, this initiates the hydrokinetic apparatus and initiates the process of recharging the battery pack. This process is continuous, both while the vehicle is in use travelling and even when the vehicle is parked.

Figure 2:
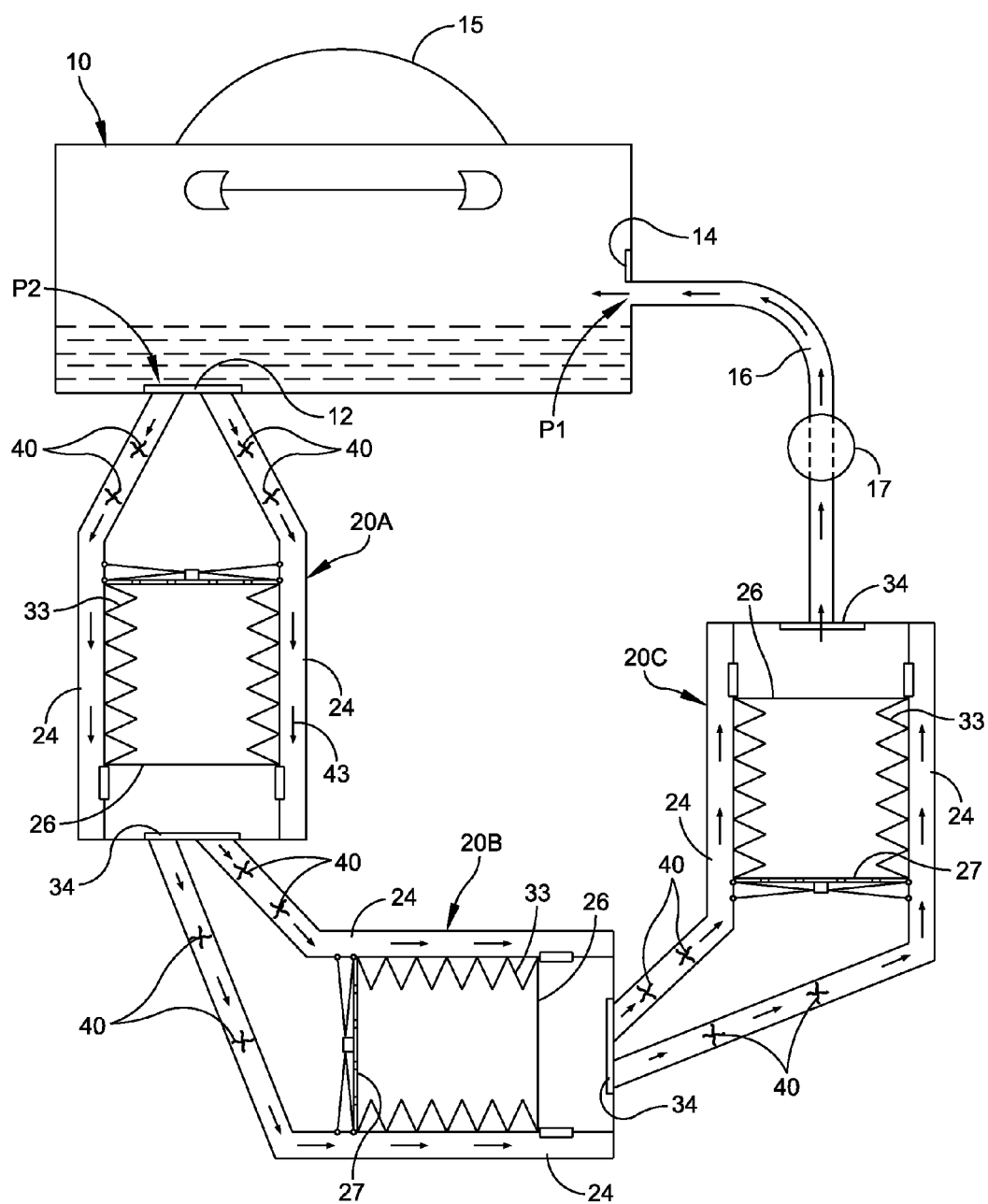
FIG. 2 is a schematic representation of one embodiment of the present invention employing a substantially rectangular liquid reservoir and multiple generator modules.

In accordance with the present invention, there may be provided two separate liquid reservoirs and each of these liquid reservoirs, such as illustrated in FIG. 2, may be comprised also of three hydrokinetic generator modules. The liquid reservoir is shown at 10 in FIG. 2 while the generator modules are schematically depicted connected in series between an outlet port of the liquid reservoir and an inlet port of the liquid reservoir. These generator modules are identified in FIG. 2 as modules 20A, 20B and 20C. Reference is made hereinafter to the more detailed diagram of FIG. 3 for showing more specific details in particular of the generator module itself.

Once again, there are preferably two liquid reservoirs 10 with three hydrokinetic modules 20. The hydrokinetic modules are preferably mounted on stabilizing gimbals (not shown) to ensure continuous operation under any and all terrain and weather conditions. These components may be mounted on or near the vehicle firewall. The power packs may be interconnected to be configured in different manners. They may be connected in tandem or in groups depending upon the power requirement or the stress conditions that are encountered. As mentioned previously, these packs are preferably of small lithium batteries of 12 volts or possibly more than 12 volts each with at least 24 batteries in each pack. In addition to mounting on the firewall, these components may also be mounted throughout the engine compartment and in a vehicle where a gas tank is no longer needed, these components can be mounted in the area previously allocated to the gas tank.

Figure 3:
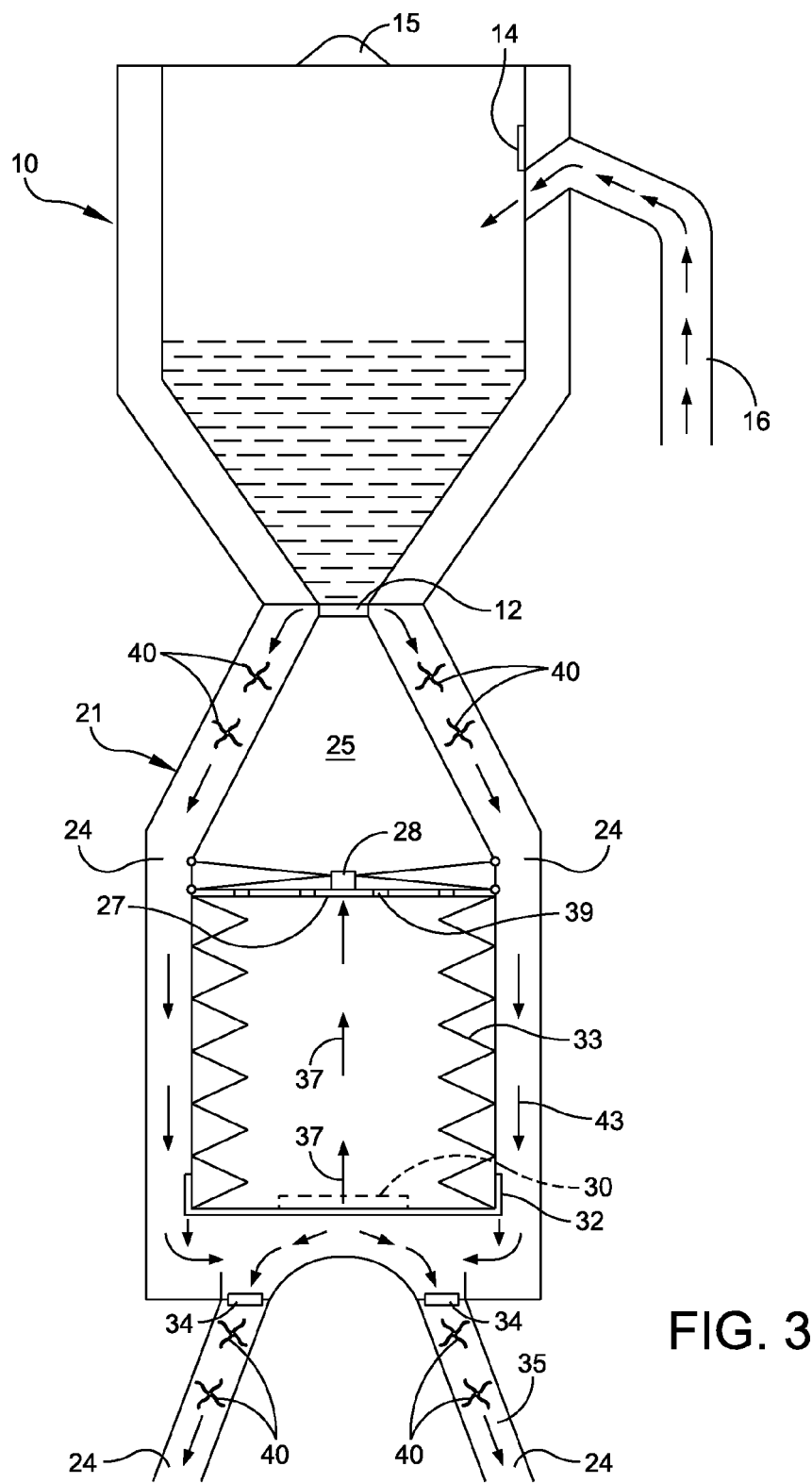
FIG. 3 is a more detailed diagram of the liquid reservoir and one of the generator modules also and showing connection to a second generator module.

In FIGS. 2 and 3, two separate types of reservoirs are employed. Each with an inlet port P1 and an outlet port P2. FIG. 2 shows a rectangular shaped reservoir that may also be tilted slightly to the left. FIG. 2 shows the inlet port at P1 and the outlet port at P2. The diagram of FIG. 3 shows an inverted bottle-shaped reservoir 10 but may also be tilted slightly to the left. Each of these reservoirs preferably has screw-type fill cap 15 with a rounded protective plastic cover. The reservoirs are meant to be filled from the top and the circulation out of each reservoir is from the bottom. In each of these reservoirs there is a retractable disc. type outflow valve 12. In the bottle-shaped reservoir of FIG. 3, the circulation is back to a port P1 that is approximately ¾ of the way up the right side of the reservoir as clearly illustrated in FIG. 3. FIG. 3 also shows a drop valve 14 at the inflow opening port P1. At the very bottom of the reservoir at the lower neck contains the retractable disc valve 12.

With respect to the rectangular-shaped reservoir of FIG. 2, this also empties through a retractable disc valve 12 at the bottom left hand end of the reservoir. In this embodiment the refilling at the port P1 may be at a location about ⅓ of the way up the right hand side of the reservoir. This embodiment also includes a drop valve 14 associated with the port P1. All of these various valves are for controlling the opening and closing of their respective ports. In connection with both types of reservoirs, they always retain some level of liquid in their contents. The reservoirs only empty out about ⅞ of their content. This facilitates more rapid refilling and assists in the stabilization of the system. When emptying occurs, the retractable disc valve opens at the bottom of the reservoir and the inflow drop valve 14 closes. When emptying is completed, the retractable disc valve 12 closes and the inflow drop valve opens. When needed, additional liquid can also be added to the reservoir by way of the screw cap 15.

In the embodiments described herein, the generator modules are considered as being of a bottle-shaped configuration. These are illustrated in particular in FIG. 3 by the generator module having a substantially cylindrical base section 22 and a tapered neck section 21. The dimensions of the particular components may be varied so as to preferably facilitate a semicircular configuration of the total system.

With respect to FIG. 2, the generator modules 20A, 20B and 20C are shown somewhat schematically, it being understood that each of these modules may be of the configuration more specifically illustrated in FIG. 3. IN FIG. 2 the first module 20A is disposed in a neck-up position. The second module 20B is positioned so as to allow the fill pipes thereof to connect with the base of the first module 20A. Preferably the module 20B is mounted in a substantially horizontal position. The third module 20C is preferably mounted relatively close to the liquid reservoir to allow smooth, rapid transfer of liquid, but not should be so far removed from the second module 20B to cause a slowing of the liquid velocity. As illustrated in FIG. 2, this third module 20C is mounted with the neck down and may be slanted slightly to the left. The module 20C is mounted close to the reservoir inflow vent at port P1, flexible tubing 16 is used for the connection between the generator module 20C and the liquid reservoir 10 at port P1. Also illustrated in FIG. 2 is a pump 17 that is coupled in the tubing 16 and is usable for assuring that there is a continuous circulation of water back into the liquid reservoir. The system of the present invention may function at least partially in accordance with gravity, particularly at the outlet of the liquid reservoir whereas at the inlet to the liquid reservoir some pumping force is advisable.

In FIG. 3 the neck portion 21 of the generator module 20 defines a continuos fill pipes 24. A pair of fill pipes that are spacedly disposed are illustrated in FIG. 3 and define therebetween, an air chamber 25 that has a predetermined volume. Located within the air chamber 25 are a pair of pressure plates 26 and 27. Pressure plate 26 is movable in the direction of arrows 37 toward the fixed plate 27. The plate 26, or the bottom of the air chamber 25, is preferably provided with a further disc valve 30. The pressure plate 27 is provided with dual operating inflow/outflow vents 39 and also is provided with a centrally disposed center contact 28. The plate 27 and contact 28 is fixed to the lower end of the bottle neck where the sections 21 and 22 are joined.

Within the generator module 20 there is also illustrated a bellows 33. The bellows 33 is attached at opposite ends to the respective plates 26 and 27. As the plate 26 is a movable plate, when water pressure causes this plate to move upwardly in the direction of arrows 37, there is a compression of the bellows until the lower plate 26 contacts the upper fixed plate 27.

As indicated previously, the action of the reservoir and generator modules is initiated by way of the controller 60 upon the sensing of a reduction in voltage at one or more of the battery packs. This causes the controller 60 to control the various valves that are shown between opened and closed positions and as now described in further detail. When the reservoir receives a signal from a battery pack, the outflow retractable disc. valve 12 at the bottom of the reservoir opens to expel the liquid. Previous to that time the reservoir is in a full condition and the fill pipes 24 are emptied. At the same time that the retractable disc. valve 12 opens, the retractable disc valve at the bottom of the module, namely valve or valves 34, close. Also, the inflow drop valves 32 are opened. This enables a path for liquid in the direction of arrows 43. From this way the water is dispersed into the two fill pipes 24 that are located on either side of the module. As the water passes the surge generators 40, this initiates action of these surge generators. The space within the module fills with water or a liquid from the bottom forcing the plate 26 in an upward direction as indicated by the arrows 37 in FIG. 3. As the liquid rises, it forces the plate 26 upwardly forcing the bellows to deflate or compress. The expelled air is forced into the air chamber 25 through the dual vents 39 in the contact plate 27.

Thus the plate 26 moves upwardly, it eventually will contact the plate 27. This condition is sensed at the sensor 28 and the following actions occur under control of the electrical control 60. The drop valves 32 close and the retractable disc. valves 34 open. Air is expanded via the dual purpose vents 39 and the bellows is reinflated. The liquid is expelled to the next module. After the liquid is expelled, the retractable disc valve 34 closes and the inflow drop valves 32 open.

Each of the generator modules preferably has four tidal surge generators 40. As illustrated in FIG. 3, each fill pipe 24 is provided with two spaced apart surge generators 40. Each of these surge generators includes a mechanical portion that may be in the form of an impeller connecting to a generator for converting to electrical energy. These surge generators 40 are preferably placed as close as possible to the top of the bottle neck. This placement allows for the receipt of the maximum surge power from the liquid expelled from the liquid reservoir.

When the module empties, the inflow drop valves 32 open and the retractable disc outflow valve closes. When the outflow from a module occurs, this outflow is coupled to the fill pipes of a module therebelow. This is illustrated in FIG. 3 by a further set of fill pipes 24 indicated at 35 which represents the top neck portion of an adjacent module. FIG. 3 also illustrates the pairs of surge generators 40 within these respective fill pipes 44. The diameters of the fill pipes in the reservoir inflow hose can be varied and in particular, can be reduced in size in order to provide a more rapid flow of the liquid.

The process of the present invention can be practiced with a variety of different forms of liquid reservoir and generator modules of different configuration. Each time that a cycle begins, there may be a momentary hesitation as the action takes place. These actions occur quite rapidly so as to be indiscernible by anyone other than a trained technician. The energy that is generated from the surge generators, as illustrated in the block diagram of FIG. 1, is coupled directly to the central distributor 70. From there the energy is distributed to the various battery packs illustrated at 50 in FIG. 1.

As also previously mentioned, an external source 55 is usable to recharge batteries 50 on a periodic basis.

Having now described a limited number of embodiments of the present invention, it should now be apparent to those skilled in the art that numerous other embodiments and modifications thereof are contemplated as falling within the scope of the present invention, as defined by the appended claims. For example, the foregoing description has mentioned the use of water that is used in the system. However, it is understood that other fluids or liquids may be employed. In colder weather in particular, the water would be supplemented by an antifreeze product.

The invention claimed is:

1. A hydrokinetic generator apparatus comprising:
   a liquid reservoir having an outlet port and an inlet port that is disposed over the outlet port;
   an outflow valve that is disposed at the outlet port of the liquid reservoir;
   at least one generator module coupled from the liquid reservoir and including at least one fill pipe for receiving liquid expelled from the liquid reservoir, and at least one outlet port;
   at least one surge generator disposed in the fill pipe;
   an outflow valve at a base of the generator module;
   means for coupling the outlet port of the generator module to the inlet port of the liquid reservoir;
   a battery pack;
   an electrical controller responsive to a voltage across the battery pack for controlling said valves; and
   an electrical charging hub responsive to the surge generator for re-charging the battery pack;
   wherein the generator module includes a pair of fill pipes;
   wherein there is defined between the pair of fill pipes an air chamber;
   further including a bellows disposed in the air chamber; and
   further including fixed and movable plates supported at opposite ends of the bellows.

2. The hydrokinetic generator apparatus of claim 1 wherein the liquid reservoir also includes a drop valve adjacent to the inlet port.

3. The hydrokinetic generator apparatus of claim 1 wherein said liquid reservoir is one of a rectangular shape and inverted bottle shape.

4. The hydrokinetic generator apparatus of claim 1 wherein the fixed plate has a plurality of inflow/outflow air vents.

5. The hydrokinetic generator apparatus of claim 4 wherein said generator module includes a base portion and a neck portion.

6. The hydrokinetic generator apparatus of claim 1 including a plurality of generator modules that are interconnected in series between the outlet port and the inlet port of the liquid reservoir.

7. A hydrokinetic generator apparatus comprising:
a liquid reservoir having an outlet port and an inlet port that is disposed over the outlet port;
an outflow valve that is disposed at the outlet port of the liquid reservoir;
at least one generator module coupled from the liquid reservoir and including at least one fill pipe for receiving liquid expelled from the liquid reservoir, and at least one outlet port;
at least one surge generator disposed in the fill pipe;
an outflow valve at a base of the generator module;
means for coupling the outlet port of the generator module to the inlet port of the liquid reservoir;
a battery pack;
an electrical controller responsive to a voltage across the battery pack for controlling said valves; and
an electrical charging hub responsive to the surge generator for re-charging the battery pack;
wherein the generator module includes a pair of fill pipes;
wherein there is defined between the pair of fill pipes an air chamber;
a drop valve disposed at the inlet port of the liquid reservoir;
a pair of drop valves at respective fill pipes;
wherein the outflow valve at a base of the generator module is comprised of a pair of retractable disc valves; and
a disc valve at an input to the air chamber.

8. A hydrokinetic generator apparatus comprising:
a liquid reservoir having an outlet port and an inlet port that is disposed over the outlet port;
at least one generator module coupled from the liquid reservoir and including at least one fill pipe for receiving liquid expelled from the liquid reservoir, and at least one outlet port;
at least one surge generator disposed in the fill pipe;
an electrical controller for controlling said valves;
a battery pack;
an electrical charging hub;
wherein the generator module includes a pair of fill pipes, and wherein there is defined between the pair of fill pipes an air chamber; and
a bellows disposed in the air chamber, fixed and movable plates supported at opposite ends of the bellows, and wherein the fixed plate has a plurality of inflow/outflow air vents.

9. The hydrokinetic generator apparatus of claim 8 wherein said generator module includes a base portion and a neck portion, including a plurality of generator modules that are interconnected in series between the outlet port and the inlet port of the liquid reservoir, a drop valve disposed at the inlet port of the liquid reservoir; a pair of drop valves at respective fill pipes; wherein the outflow valve at a base of the generator module is comprised of a pair of retractable disc valves; and a disc valve at an input to the air chamber.

10. A hydrokinetic generator system comprising:
a liquid reservoir having an outlet port and an inlet port that is disposed over the outlet port;
a plurality of generator modules that each include an input port and an output port;
said plurality of generator modules coupled in series between the outlet port of the liquid reservoir and the inlet port of the liquid reservoir;
said plurality of generator modules being inter-coupled for liquid flow therebetween so that the output port of one generator module connects with the input port of an adjacent generator module;
each said generator module including a pair of fill pipes for receiving liquid expelled from the liquid reservoir;
at least one surge generator disposed in each fill pipe;
an electrical controller;
a battery pack; and
an electrical charging hub;
wherein there is defined between the pair of fill pipes an air chamber and further including a bellows disposed in the air chamber;
fixed and movable plates supported at opposite ends of the bellows, and wherein the top fixed plate has a plurality of inflow/outflow air vents.

11. The hydrokinetic generator system of claim 10 wherein said generator module includes a base portion and a neck portion, including a plurality of generator modules that are interconnected in series between the outlet port and the inlet port of the liquid reservoir, an outflow valve that is disposed at the outlet port of the liquid reservoir; an outflow valve at a base of the generator module; a drop valve disposed at the inlet port of the liquid reservoir; a pair of drop valves at respective fill pipes; wherein the outflow valve at a base of the generator module is comprised of a pair of retractable disc valves; and a disc valve at an input to the air chamber.

12. The hydrokinetic generator system of claim 10 including valve means for controlling the flow of water through the fill pipes, wherein the electrical controller is responsive to a voltage across the battery pack for controlling said valve means; and wherein the electrical charging hub is responsive to the surge generator for re-charging the battery pack.

* * * * *